(12) United States Patent
Duran et al.

(10) Patent No.: US 10,967,595 B2
(45) Date of Patent: Apr. 6, 2021

(54) DUAL MOLD SPACER

(71) Applicant: Compagnie Generale des Etablissements Michelin, Clermont-Ferrand (FR)

(72) Inventors: Harvey Duran, Loganville, GA (US); Steven Beasley, Jackson, GA (US); Dennis Marion Lowry, Jr., Cleveland, SC (US)

(73) Assignee: CompagnieGenerale Des Etablissements Michelin, Clermont-Ferrard (FR)

( * ) Notice: Subject to any disclaimer, the term of this patent is extended or adjusted under 35 U.S.C. 154(b) by 69 days.

(21) Appl. No.: 16/488,475

(22) PCT Filed: Mar. 29, 2017

(86) PCT No.: PCT/US2017/024664
§ 371 (c)(1),
(2) Date: Aug. 23, 2019

(87) PCT Pub. No.: WO2018/182586
PCT Pub. Date: Oct. 4, 2018

(65) Prior Publication Data
US 2020/0009815 A1 Jan. 9, 2020

(51) Int. Cl.
*B29D 30/52* (2006.01)
*B29D 30/54* (2006.01)
(Continued)

(52) U.S. Cl.
CPC .......... *B29D 30/54* (2013.01); *B29C 33/0022* (2013.01); *B29C 35/02* (2013.01); *B29C 2037/94* (2013.01); *B29D 30/52* (2013.01)

(58) Field of Classification Search
CPC ........ B29D 30/52; B29D 30/54; B29D 30/56; B29C 33/0022; B29C 33/424; B29C 35/02; B29C 2037/94
See application file for complete search history.

(56) References Cited

U.S. PATENT DOCUMENTS 4,818,203 A * 4/1989 Majerus .............. B29C 45/0003
156/125
5,709,830 A * 1/1998 Triantafyllis ...... B29D 30/0061
264/219
(Continued)

FOREIGN PATENT DOCUMENTS

FR 2893966 A1 6/2007
WO 2016105411 A1 6/2016

OTHER PUBLICATIONS

European Patent Office; International Search Report and Written Opinion for patent application PCT/US2017/024664; International filed Mar. 29, 2017; Publisher European Patent Office, Rijswijk, Netherlands, dated May 30, 2017, pp. 1-12, enclosed.
(Continued)

*Primary Examiner* — James P Mackey
(74) *Attorney, Agent, or Firm* — Neal P. Pierotti (57) ABSTRACT

A dual mold spacer for use with a dual mold assembly is provided that includes a first side portion configured to engage a first side rail of the dual mold assembly. A second side portion is configured to engage a second side rail of the dual mold assembly. A body portion extends from the first side portion to the second side portion and is configured to be located between a press of the dual mold assembly and first and second molds of the dual mold assembly. The body portion is configured for being spaced from and free from engagement with the first and second molds.

11 Claims, 5 Drawing Sheets

(51) Int. Cl.
  *B29C 35/02* (2006.01)
  *B29C 33/00* (2006.01)
  *B29C 37/00* (2006.01)

(56) References Cited

U.S. PATENT DOCUMENTS

| | | | | |
|---|---|---|---|---|
| 5,769,975 | A * | 6/1998 | Keys | B29C 33/3828 |
| | | | | 152/209.6 |
| 5,887,788 | A | 3/1999 | Wakui et al. | |
| 6,780,268 | B2 * | 8/2004 | Wellman | B29D 29/08 |
| | | | | 156/137 |
| 7,186,103 | B2 * | 3/2007 | Menard | B29C 33/44 |
| | | | | 425/28.1 |
| 8,632,715 | B2 * | 1/2014 | Zarak | B29D 30/52 |
| | | | | 264/319 |
| 10,493,711 | B2 * | 12/2019 | Fortner | B30B 11/14 |
| 10,596,774 | B2 * | 3/2020 | Duran | B29D 30/56 |
| 2011/0148001 | A1 | 6/2011 | Cress | |
| 2011/0254185 | A1 * | 10/2011 | Liew | B29C 33/306 |
| | | | | 264/40.5 |
| 2014/0318678 | A1 * | 10/2014 | Colby | B29C 33/42 |
| | | | | 152/209.18 |
| 2017/0246824 | A1 | 8/2017 | Duran | |

OTHER PUBLICATIONS

Zarges, Zarges Leitern, Geruste and mehr, catalog, Oct. 31, 2012, URL: https://www.hahn-kolb.de/media/downloads/pdf/downloadcenter/prospekte/Zarges-Gesamtkatalog?Leitern?Z?500?Z600.pdf, pp. 1-13, enclosed.

Hercher, Hercher Metallbau, Fachbetrieb fur Aluminium-Transportgerate, catalog, May 31, 2016, URL: http://www.metallbau-hercher.de/wp-content/uploads/2016/05/hercher-metallbau-aluminium-transportgerate-produktbroschuere.pdf, pp. 1-6, enclosed.

* cited by examiner

DUAL MOLD SPACER

CROSS-REFERENCE TO RELATED APPLICATIONS

The present application is a 35 U.S.C. § 371 application of PCT/US17/24664 filed on Mar. 29, 2017 and entitled "Dual Mold Spacer." PCT/US17/24664 is incorporated by reference herein in its entirety for all purposes.

FIELD OF THE INVENTION

The present invention relates generally to spacers for use in dual molds. More particularly, the present application involves a dual mold spacer for use in a dual mold that is used to produce retread tire tread that functions to prevent damage to a center rib of the dual mold.

BACKGROUND

Retreaded tires are those that have a new tread section placed onto a carcass of the tire after the tread section currently on the tire is worn down. To make this replacement, the tread currently on the tire may be removed, and the outer surface of the carcass treated for acceptance of the new tread. A layer of cushion gum can be applied to the surface of the carcass and the new tread section may be applied to this cushion gum layer. The cushion cum layer can be cured in order to cause the new tread section to be attached to the carcass.

The new tread section can be a cured piece of rubber that is formed by a mold and a press. The mold is a retread tire mold and can be made from a plurality of mold sectors that are arranged against one another into a linear arrangement. Uncured rubber can be placed on top of the mold sectors and a press may be moved in the vertical direction to press the rubber into the mold sectors. The press engages a flat underside of the tread strip, and tread element features are molded into the rubber via corresponding features of the mold sectors. The mold can be heated, and this combination of heat and pressure may cure the rubber into the desired shape.

The mold may be arranged as a dual mold in that two strips of retread tire tread are formed at the same time by the mold. The mold sectors for each of the two strips are arranged side by side in the longitudinal direction of the mold, and a center rib that likewise extends in the longitudinal direction separates the mold sectors for these two strips. If the press is closed, and rubber is not present in the mold, the press will engage and damage the center rib. This damage may be immediate and severe and requires repair of the center rib before additional molding is conducted. Although the operators are trained not to close the dual mold press when rubber is not located within the mold, in the course of production mistakes are made and these mistakes lead to destruction of mold components, and to downtime with the loss of dual mold capacity. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a dual mold spacer 12 that prevents damage to a center rib 68 or other portions of mold sectors 74 of a dual mold assembly 10. The dual mold spacer 12 is designed to be used when the dual mold assembly 10 does not include rubber, and the dual mold spacer 12 is not present within the dual mold assembly 10 when rubber is in fact located therein. The dual mold assembly 10 does not need the dual mold spacer 12 when rubber is in the mold sectors 74 because the presence of the rubber will function to appropriately dissipate the force of the press 24 and prevent it from damaging the center rib 68 and other portions of the mold sectors 74. As such, even if the operator inadvertently lowers the press 24, it will not cause damage so long as rubber is in the mold sectors 74. The dual mold spacer 12 is placed into the dual mold assembly 10 when the formed retread bands are demolded or rubber is otherwise not present within the dual mold assembly 10. The dual mold spacer 12 rests upon first and second side rails 20, 22 and remains out of contact with architecture of the mold sectors 74. If an operator inadvertently actuates the press 24 it will engage the dual mold spacer 12 instead of the center rib 68 or other mold sector 74 portions. Force from the press 24 will be counteracted by the presence of the dual mold spacer 12 so that the center rib 68 and other architectural portions of the mold sectors 74 will not be damaged.

FIG. 1-4 illustrate a dual mold spacer 12 in accordance with one exemplary embodiment that has a first side portion 14 and a second side portion 16 that are both engaged by a body portion 18 that spans the distance between the first side portion 14 and second side portion 16. The first side portion 14 can be configured in a variety of manners, but as shown in this embodiment is arranged as a first side bar 30. The first side bar 30 has a length that is longer than its width or height and extends for the entire longitudinal length of the dual mold spacer 12. The second side portion 16 is arranged as a second side bar 32 in the illustrated embodiment, and has a length that is the same as the length of the first side bar 30. The second side bar 32 has a rectangular cross-sectional shape and has a width and height less than its length. The body portion 18 is arranged into a first cross-bar 34, a second cross-bar 36, and a third cross-bar 38. The cross-bars 34, 36 and 38 are spaced from and out of engagement with one another. Although three cross-bars 34, 36 and 38 are shown, it is to be understood that any number of cross-bars may be present in other exemplary embodiments. For example, 1 cross bar, 4 cross bars, from 5-10, from 11-20, or up to 30 cross-bars may be present in the dual mold spacer 12 in other exemplary embodiments.

The cross-bars 34, 36, 38 have a rectangular cross-section and are longer in the lateral direction than in the longitudinal direction. The first side bar 30 has three depressions present in its upper surface 70 that receive the three cross-bars 34, 36, 38 such that each one of the depressions receives one of the cross-bars 34, 36, 38. The cross-bars 34, 36, 38 are all each lower than the upper surface 70 in the vertical direction. However, other arrangements are possible in which the cross-bars 34, 36, 38 are in face at the same height as the upper surface 70, or even higher than the upper surface 70 in the vertical direction. The second side bar 32 also has three depressions that each receive one of the cross-bars 34, 36, 38 so that the cross-bars 34, 36, 38 extend in the lateral direction and are angled 90 degrees to the first and second side bars 30, 32. The depressions into which the cross-bars 34, 36, 38 are received cause them to be lower than the upper surface 72 of the second side bar 32.

The upper surface 70 of the first side bar 30 is at the same vertical height as the upper surface 72 of the second side bar 32 such that these two surfaces 70, 72 lie in a common plane. The upper surfaces of the cross-bars 34, 36, 38 are lower than the plane into which the surfaces 70, 72 lie. The cross-bars 34, 36, 38 may be welded to the first and second side bars 30, 32, or could be mechanically attached in other exemplary embodiments. The first cross-bar 34 is located at the forward end of the dual mold spacer 12 but is spaced some amount from the first terminal end 46 of the first side bar 30. Likewise, the first cross-bar 34 is spaced some amount in the longitudinal direction from the first terminal end 50 of the second side bar 32. The terminal ends 46, 50 may lie in the same plane as one another without any of the cross-bars 30, 32, 34 being in this common plane. The first and second side bars 30, 32 on their opposite ends have second terminal ends 48, 52 that lie in a common plane. The second cross-bar 36 is spaced some distance from the second terminal ends 48, 52 in the longitudinal direction so that it is not located in this common plane. Other embodiments are possible in which one of the cross-bars is in fact located at the second terminal ends 48, 52 so as to be located at the same location on the dual mold spacer 12 as the terminal ends 48, 52. The third cross-bar 38 is located at the midpoint of the first and second side bars 30, 32 in the longitudinal direction of the dual mold spacer 12, and is spaced the same amount from the first terminal end 46 as the second terminal end 48. The spacing between the cross-bars 34, 36 and 38 may be arranged so that the third cross-bar 38 is located the same distance from the first cross-bar 34 as it is from the second cross-bar 36 in the longitudinal direction. However, other versions are possible in which the third cross-bar 38 is closer to either the first cross-bar 34 or to the second cross-bar 36.

The first side bar 30 defines a channel 54 that is open on both ends and runs the entire longitudinal length of the first side bar 30. In particular, the first side bar 30 includes a flange 58 and a flange 60 that define the sides of the channel 54. Flange 58 is longer than flange 60 in that flange 58 extends a greater distance from the upper surface 70 than does flange 60. Other variations are possible in which the flanges 58, 60 extend the same distance in the vertical direction from the upper surface 70 so that the channel 54 has sides that are of the same size. The channel 54 is open in a direction facing away from the upper surface 70, and is more open in a direction facing towards the second side bar 32 than in the direction facing away from the second side bar 32 due to the increased size of the flange 58 as compared to flange 60.

The upper surface 72 of the second side bar 32 may be flat along its entire width and length. Likewise, the oppositely disposed lower surface 62 of the second side bar 32 can be flat along its entire length and width. The lower surface 62 may be located in the vertical direction at the same location as the surface of the first side bar 30 that extends between the flanges 58, 60 and forms a boundary of the channel 54. However, in other arrangements, the vertical height of this surface may be higher or lower than the lower surface 62. This surface and the lower surface 62 may be located lower in the vertical direction than the cross-bars 34, 36 and 38.

Another embodiment of the dual mold spacer 12 is shown with reference to FIGS. 5-8. Here, the first side portion 14 is arranged as a first side bar 30 in essentially the same manner as previously discussed, and the second side portion 16 is likewise arranged as previously discussed as a second side bar 32. The various components of the first and second side bars 30, 32 such as the upper surfaces 70, 72, the lower surface 62, the channel 54, and the terminal ends 46, 48, 50 and 52 may be arranged as previously described and a repeat of this information is not necessary. Instead of having three cross-bars, the dual mold spacer 12 has only two—a first cross-bar 34 and a second cross-bar 36. The first and second cross-bars 34 and 36 are spaced from all of the terminal ends 46, 48, 50 and 52 so that portions of the first and second side bars 30, 32 are present between the cross-bars 34, 36 and the terminal ends 46, 48, 50, 52. The cross-bars 34, 36 may be equally spaced from the terminal ends 46, 48, 50, 52 so that the first cross-bar 34 is the same distance from terminal ends 46, 50 as the second cross-bar 36 is from the terminal ends 48, 52. The first and second cross-bars 34, 36 each extend in the lateral direction and are parallel to one another and are located within grooves of the first and second side bars 30, 32 so that they are below the upper surfaces 70, 72 in the vertical direction. The cross-bars 34, 36 may be attached to the side bars 30, 32 through welding or by any other mechanism such as mechanical fasteners or via integral formation.

Figure 1:
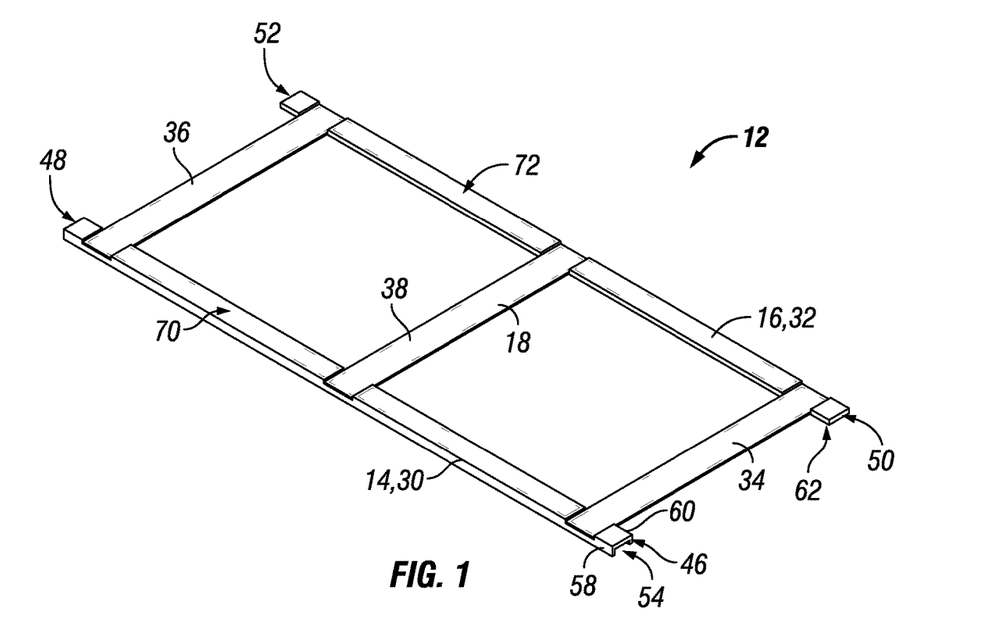
FIG. 1 is a perspective view of a dual mold spacer.
Figure 2:
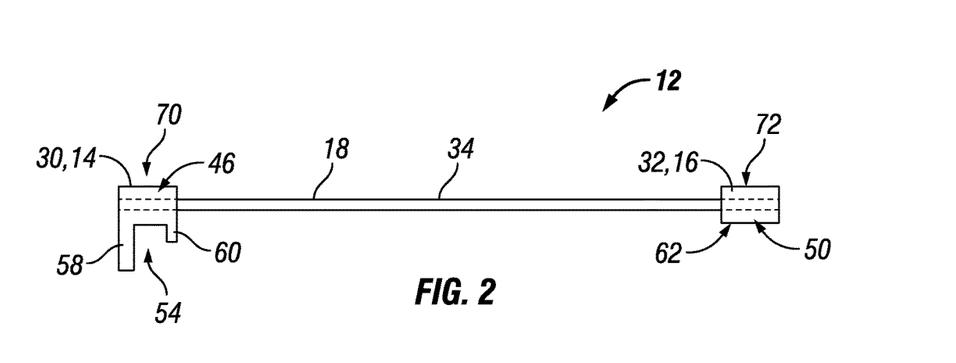
FIG. 2 is a front view of the dual mold spacer of FIG. 1.
Figure 3:
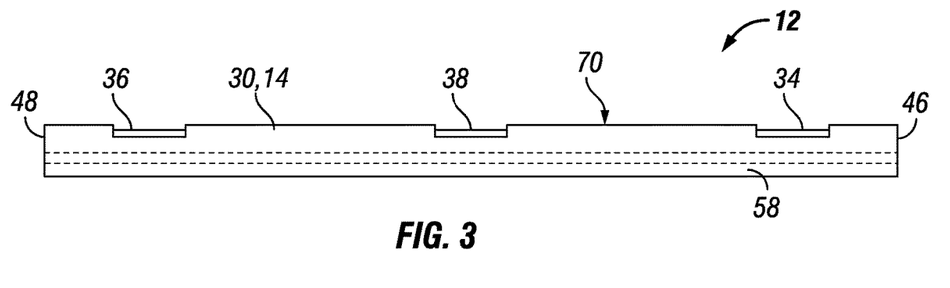
FIG. 3 is a side view of the dual mold spacer of FIG. 1.
Figure 4:
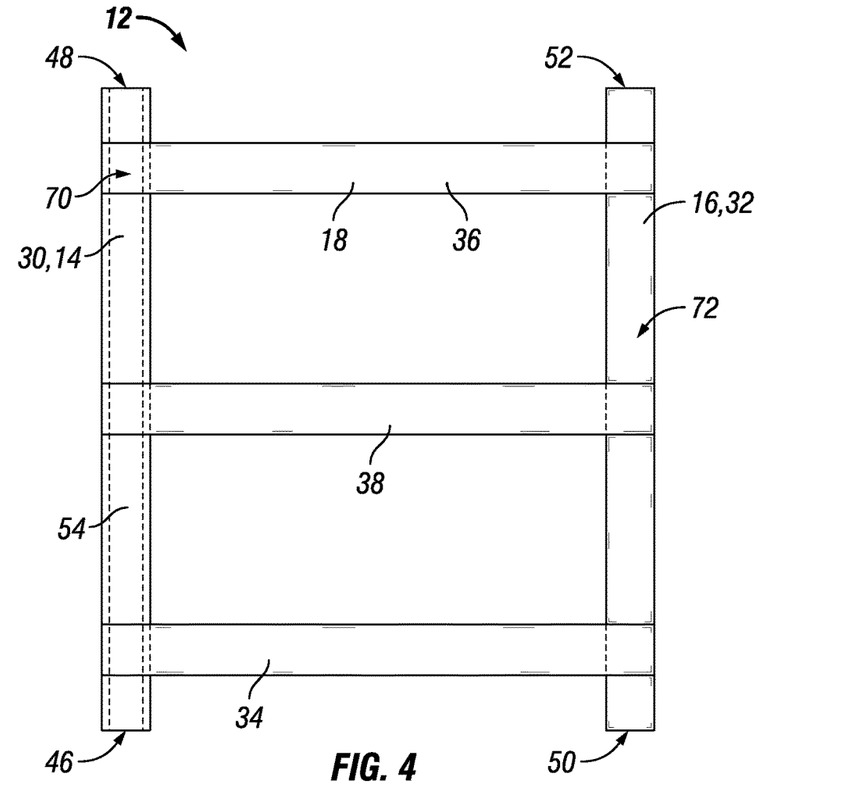
FIG. 4 is a top plan view of the dual mold spacer of FIG. 1.
Figure 5:
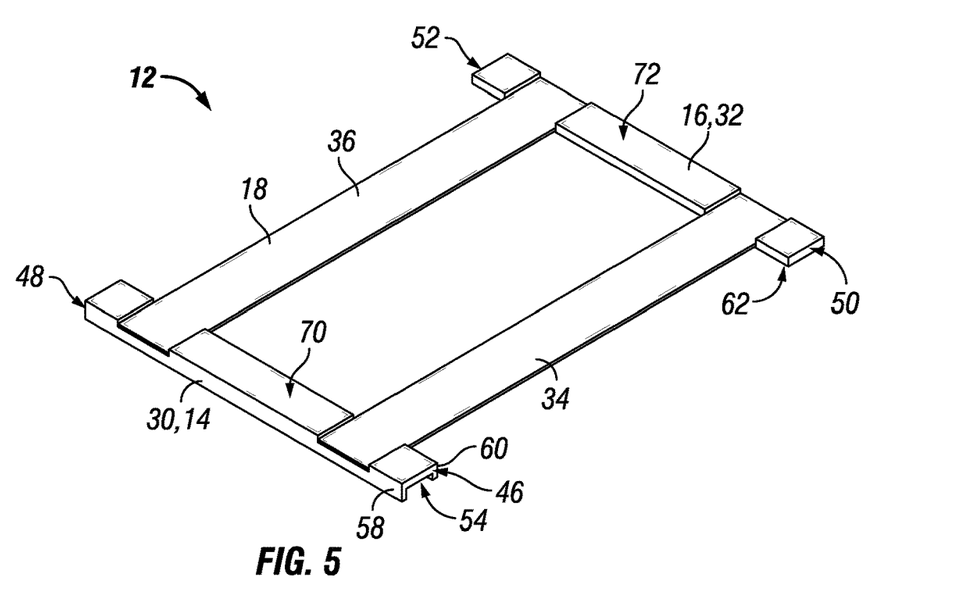
FIG. 5 is a perspective view of another embodiment of the dual mold spacer.
Figure 6:
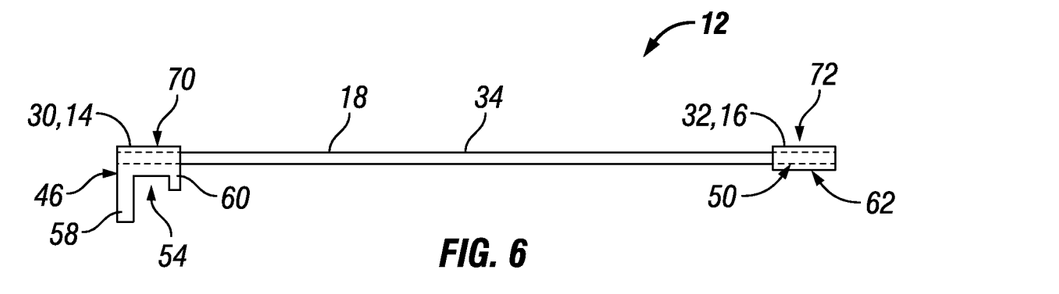
FIG. 6 is a front view of the dual mold spacer of FIG. 5.
Figure 7:
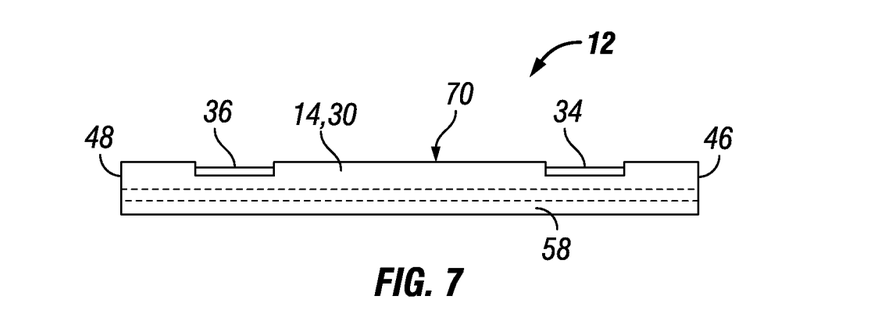
FIG. 7 is a side view of the dual mold spacer of FIG. 5.
Figure 8:
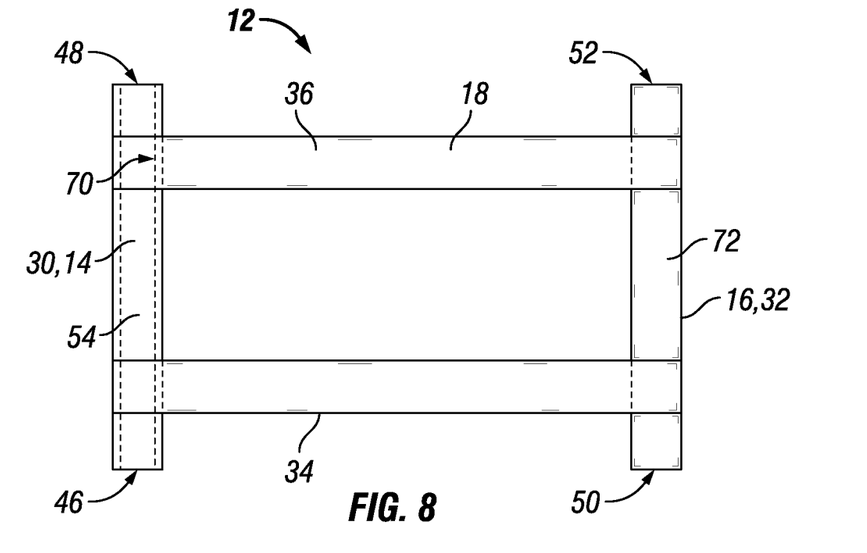
FIG. 8 is a top plan view of the dual mold spacer of FIG. 5.
Figure 9:
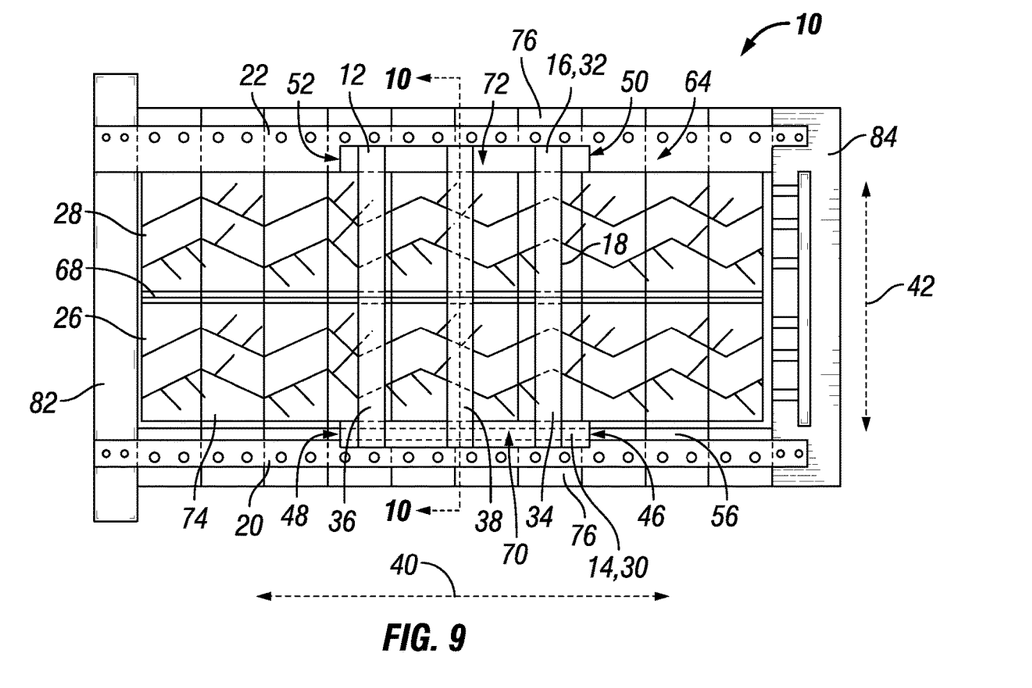
FIG. 9 is a top plan view of a dual mold assembly with the press removed for clarity.

FIG. 9 shows a top view of the dual mold assembly 10 with the press 24 removed for clarity. The dual mold assembly 10 includes a first mold 26 and an adjacently disposed second mold 28. A center rib 68 separates the first mold 26 from the second mold 28, and is the attachment point between the single molds 26, 28 built together. The molds 26, 28 can have architectural elements that result in tread bands being formed in both molds 26, 28 that are identical to one another. The use of dual molds 26, 28 allows for two tread bands to be formed per cycle in the dual mold assembly 10, instead of just one, and increases the output of the molding process. The molds 26, 28 and the center rib 68 can be made by a series of mold sectors 74 that are placed against one another in the dual mold assembly 10. The mold sectors 74 each extend across the full width of the molds 26, 28 in the lateral direction 42 of the dual mold assembly 10 and form a portion of the molds 26, 28 and the center rib 68. In other versions, each one of the mold sectors 74 may only include portions of one of the molds 26 or 28 and may not include the center rib 68, which can be a separate component different from the mold sectors 74.

The mold sectors 74 are constrained at one end by the infeed end 82, and at their opposite end by the trim post end 84. In this regard, the mold sectors 74 engage a rigid lip or end of the infeed end 82 and cannot move beyond this infeed end 82 in the longitudinal direction 40 of the dual mold assembly 10. The trim post end 84 includes a number of screws that can be actuated in order to engage the immediately adjacent mold sector 74 and force it, and the rest of the mold sectors 74, in the longitudinal direction 40 against one another and against the infeed end 82. Other mechanisms of applying this compressive force to the mold sectors 74 are possible in accordance with other exemplary embodiments.

In use, uncured rubber is moved over the infeed end 82 to the trim post end 84 and placed on top of the mold sectors 74 and cured through pressing by the press 24 and heating of the mold sectors 74. As shown in FIG. 9, the uncured rubber is not present and the dual mold spacer 12 is inserted into the dual mold assembly 10 in order to protect the mold sectors 74 from being damaged by the press 24 should the press inadvertently be actuated and forced down onto the molds 26, 28 and center rib 68. The dual mold spacer 12 is shorter than the molds 26, 28 in the longitudinal direction 40 and does not stretch all the way from the infeed end 82 to the trim post end 84. The dual mold spacer 12 is positioned half way between the ends 82, 84 and rests upon first and second side rails 20, 22 of the dual mold assembly 10. In other versions, the dual mold spacer 12 may extend all the way across the molds 26, 28 in the longitudinal direction 40. The mold sectors 74 are held to the base 78 of the dual mold assembly 10 by the use of side rails 20, 22 that rest upon flanges 76 of the mold sectors 74 that are located at outboard ends of the mold sectors 74 in the lateral direction 42. The side rails 20, 22 are secured onto the tops of the flanges 76 by the use of screws or other mechanical fasteners which secure the flanges 76 to the base 78 of the dual mold assembly 10.

The first side bar 30 is located outboard of the tread forming pattern of the first mold 26, and the second side bar 32 is located outboard of the tread forming pattern of the second mold 28. The cross-bars 34, 36, 38 are positioned over top of and extend across the tread forming patterns of the molds 26, 28 and the center rib 68 in the lateral direction 42. The spacing of the cross-bars 34, 36, 38 leaves areas of the molds 26, 28 uncovered and the dual mold spacer 12 does not cover the entire tread forming surfaces of the molds 26, 28.

Figure 10:
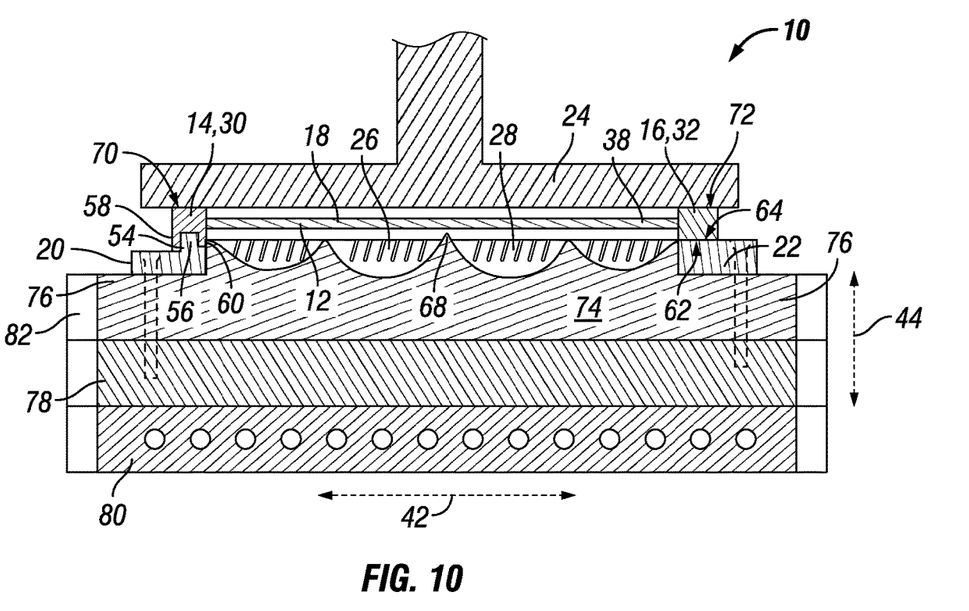
FIG. 10 is a cross-sectional view along line 10-10 of FIG. 9.

FIG. 10 shows a side view of the dual mold assembly 10 along line 10-10 of FIG. 9 with the press 24 moved into position so as to engage the dual mold spacer 12. The upper surfaces 70, 72 are located at the same position as one another in the vertical direction 44 of the dual mold assembly 10 and are higher in the vertical direction 44 than any portion of the mold sectors 74. The press 24 engages the upper surface 70 and 72 when actuated and moved down in the vertical direction 44. The press 24 remains free from engagement with the cross-bars 34, 36, 38. However, in other versions the cross-bars 34, 36 and 38 may be at the same height as the upper surfaces 70, 72 and engaged with them by the press 24. In yet other exemplary embodiments, the cross-bars 34, 36, 38 are higher than the upper surface 70, 72 and are engaged by the press 24 while the upper surfaces 70, 72 are not engaged by the press 24. In yet other arrangements, the heights of the upper surfaces 70, 72 are selected so that one of them is engaged by the press 24 while the other one is not engaged by the press 24.

The first side rail 20 includes a projection 56 that runs along its entire length in the longitudinal direction 40 and that extends upwards in the vertical direction 44. The size and shape of the projection 56 is complimentary to the channel 54 so that the projection 56 fits within the channel 54 when the dual mold spacer 12 is placed onto the side rails 20, 22. The first side bar 30 thus rests on top of the first side rail 20 and the projection 56 limits movement of the first side bar 30 relative to the first side rail 20 in the lateral direction 42. The second side rail 22 has a flat upper surface 64 onto which the flat lower surface 62 of the second side bar 32 engages and rests when the dual mold spacer 12 is placed into the dual mold assembly 10. The dual mold spacer 12 thus rests on top of the first and second side rails 20 and 22 and is not mechanically attached or otherwise connected, removably or permanently, to the side rails 20, 22. The operator may simply place the dual mold spacer 12 onto the side rails 20, 22 when the dual mold assembly 10 is empty and need not fasten or otherwise connect the dual mold spacer 12.

The mold sectors 74 rest on top of a base 78. Bolts extend through the first side rail 20, the flanges 76 of the mold sectors 74 and into the base 78 in order to connect the first side rail 20 to the mold sectors 74 and in turn this combination to the base 78. In a similar manner, a series of bolts extend through the second side rail 22 and the flanges 76 of the mold sectors 74 and into the base 78 in order to effect attachment of these components to one another. Although shown as using a series of bolts, other mechanisms of attaching the mold sectors 74 to the base 78 with the side rails 20, 22 are possible in other exemplary embodiments. The base 78 rests upon a platen 80 through which heated water may flow in order to heat the base 78 and in turn heat the mold sectors 74 to function to cure the rubber that is being cured by the dual mold assembly 10. Other means of heating the platen 80 are possible, such as through the use of electrical resistance.

As shown, the force from the press 24 is transferred into the first and second side rails 20, 22 through the engagement of the press 24 with the upper surfaces 70, 72. The cross-bars 34, 36, 38 are free from engagement with the tread forming portions of the molds 26, 28 and the center rib 68 and the force from the press 24 is not directed into these components and they are not damaged when the press 24 is actuated and no rubber is present in the molds 26, 28. The force is directed through the first and second side bars 30, 32 and into the first and second side rails 20, 22 and then into the flanges 76 of the mold sectors 74. The force is then directed into the base 78 and finally into the platen 80.

Figure 11:
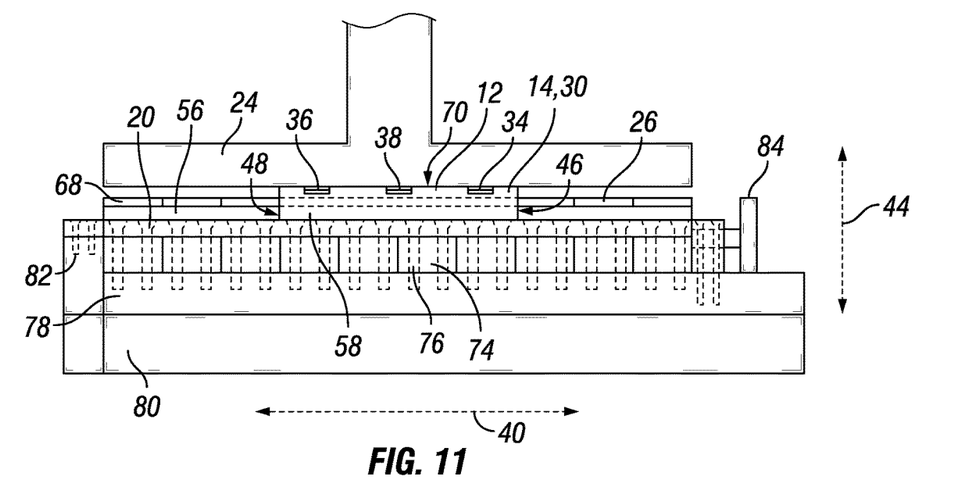
FIG. 11 is a side view of the dual mold assembly of FIG. 9.

FIG. 11 is a side view of the dual mold assembly 10 of FIGS. 9 and 10 with the press 24 shown. The press 24 extends both forward and rearward of the dual mold spacer 12 in the longitudinal direction 40 when the press 24 engages the dual mold spacer 12 and applies force thereto. The tread forming portions of the mold sectors 74 directly face the press 24 when the press 24 is actuated but are not engaged by the press 24 due to the presence of the dual mold spacer 12. The trim post end 84 is shown as being attached to the base 78 through the use of bolts, and the opposite end of the mold sectors 74 at the infeed end 82 is attached to the base 78 through the use of bolts as well. The side bars 30, 32 are not constrained to move in the longitudinal direction 40 along the side rails 20, 22. However, the weight of the dual mold spacer 12 and friction may function to keep the side bars 30, 32 in relatively the same place in the longitudinal direction 40 when the press 24 applies force as the dual mold spacer 12 is not mechanically attached to the first and second side rails 20, 22. Application of force from the press 24 forces the side bars 30, 32 in the vertical direction 44 down onto the side rails 20, 22 and they are not slid along the side rails 20, 22 in the longitudinal direction 40.

Figure 12:
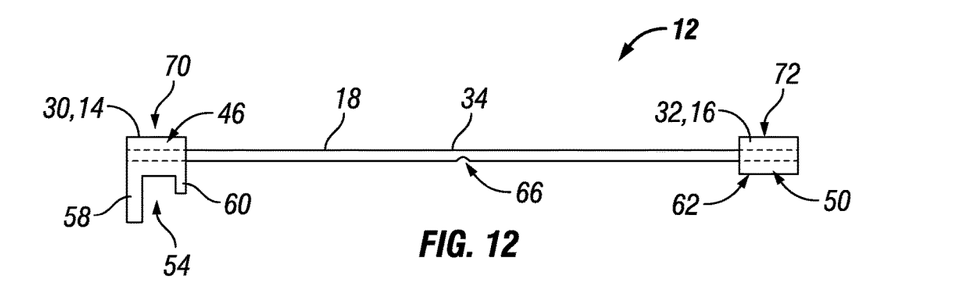
FIG. 12 is a front view of an alternate embodiment of the dual mold spacer that has a center rib groove.

FIG. 12 shows an alternate embodiment of the dual mold spacer 12 that is arranged in a similar manner as the previously described embodiments. However, the first cross-bar 34 has a center rib groove 66 that is on the underside surface of the first cross-bar 34 at the midpoint in the lateral direction from both the first and second side bars 30, 32. When the dual mold spacer 12 is placed into the dual mold assembly 10, the center rib groove 66 provides a void into which the center rib 68 may be disposed so that the center rib 68 does not engage the first cross-bar 34 and be damaged by the first cross-bar 34. Depending upon how many cross-bars are present, all of the cross-bars may have a similar center rib groove 66 that are in line with the center rib groove 66 of the first cross-bar 34 to accommodate the insertion of the center rib 68 along its entire longitudinal length of the dual mold spacer 12. The dual mold spacer 12 in FIG. 12 has three cross-bars 34, 36, 38 and all of these cross-bars 34, 36, 38 have a center rib groove 66 to keep the center rib 68 from engaging the cross-bars 34, 36, 38 and being damaged. The remaining undersides of the cross-bars 34, 36, 38 may be flat and without any other voids.

Figure 13:
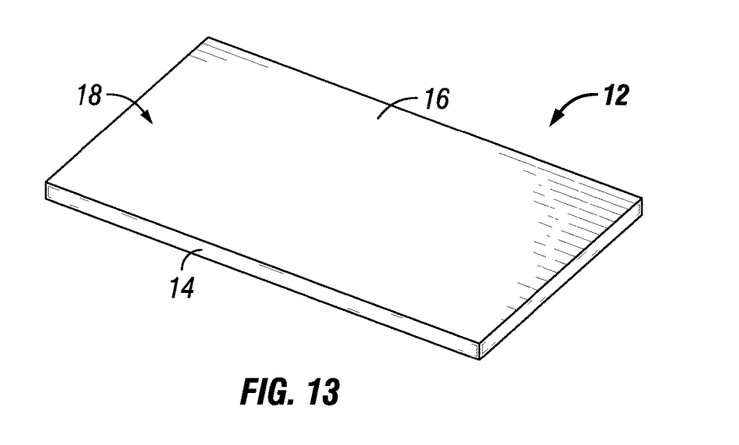
FIG. 13 is a perspective view of an alternate embodiment of the dual mold spacer.

Although shown as being configured into the first side bar 30, the second side bar 32, and one or more cross-bars 34, 36, 38, the first side portion 14, the second side portion 16, and the body portion 18 need not be so configured in accordance with other exemplary embodiments. FIG. 13 shows another embodiment of the dual mold spacer 12 in which the first side portion 14 is a solid section and is rectangular in shape. The second side portion 16 is likewise solid and rectangular in cross-sectional shape. The body portion 18 is also solid and rectangular in cross-sectional shape and extends from the first side portion 14 to the second side portion 16 along the entire longitudinal lengths of the first and second side portions 14, 16. The resulting dual mold spacer 12 is a solid piece that has a rectangular cross-sectional shape along its entire longitudinal length. The dual mold spacer 12 can be placed into the dual mold assembly 10 so that the first and second side rails 20, 22 are engaged by the first and second side portions 14, 16 and so that the body portion 18 extends over and out of engagement with the tread forming features of the first mold 26 and the second mold 28 and the center rib 68. The dual mold spacer 12 will function to protect molds 26, 28 and center rib 68 as previously discussed as the force from the press 24 will be directed into the first and second side portions 14, 16 and into the flanges 76 of the mold sectors 74.

Any type of material or materials may be used to make up the first side portion 14, second side portion 16, and body portion 18. These portions may be made of steel, aluminum, or titanium in accordance with certain exemplary embodiments. Some of the portions 14, 16, 18 may be made of one material while other portions 14, 16, 18 are made of a different material so that the dual mold spacer 12 is made up of different materials. In accordance with one exemplary embodiment, the first side rail 20, second side rail 22, and cross-bars 34, 36, 38 are all made up of 6061 aluminum alloy. The portions 14, 16, 18 may be marked with indicia that instruct the operator as to what orientation the dual mold spacer 12 should be placed in when inserted into the dual mold assembly 10. For example, the first side bar 30 may be marked with the phrase "Front Up" on its outer surface that is the most outboard in the lateral direction so that an operator knows to have the first side bar 30 closest to him or her and so that the upper surface 70 is directed upwards in the vertical direction 44. The terminal ends 46, 48, 50, 52 could also be marked with "Trim post end" or "Infeed end" so that the user knows which direction to orient the dual mold spacer 12 relative to the infeed end 82 and the trim post end 84. The use of the dual mold spacer 12 prevents damage to the tread forming portions of the dual molds 26, 28 and to the center rib 68 when the press 24 is inadvertently actuated without rubber present in the dual molds 26, 28.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A dual mold spacer for use with a dual mold assembly, comprising:
   a first side portion that is configured to engage a first side rail of the dual mold assembly;
   a second side portion that is configured to engage a second side rail of the dual mold assembly;
   a body portion that extends from the first side portion to the second side portion, wherein the body portion is configured to be located between a press of the dual mold assembly and first and second molds of the dual mold assembly, wherein the body portion is configured for being spaced from and free from engagement with the first and second molds of the dual mold assembly;
   wherein the first side portion is a first side bar, and wherein the second side portion is a second side bar;
   wherein the first side bar defines a channel that extends in the longitudinal direction of the dual mold assembly, wherein the channel is configured for receiving a projection of the first side rail, wherein the channel extends from a first terminal end of the first side bar to a second terminal end of the first side bar such that the channel extends along an entire longitudinal length of the first side portion in the longitudinal direction;
   wherein the channel of the first side portion is defined by a pair of flanges that are a longer flange and a shorter flange in which the longer flange is longer in a vertical direction of the dual mold assembly than the shorter flange, wherein the shorter flange is closer to the second side portion in a lateral direction of the dual mold assembly than the channel is to the second side portion in the lateral direction;
   wherein the body portion has a lower surface that has a surface normal that is located between the first side portion and the second side portion in the lateral direction of the dual mold assembly that extends in the same direction as does the channel in the vertical direction of the dual mold assembly.

2. The dual mold spacer as set forth in claim 1, wherein the body portion comprising at least one cross-bar.

3. The dual mold spacer as set forth in claim 2, wherein the body portion has two cross-bars, wherein a first one of the cross-bars engages both the first side bar and the second side bar and extends from the first side bar to the second side bar;
   wherein a second one of the cross-bars engages both the first side bar and the second side bar and extends from the first side bar to the second side bar, wherein the first cross-bar is spaced from and free from engagement with the second cross-bar in the longitudinal direction of the dual mold assembly.

4. The dual mold spacer as set forth in claim 3, wherein the body portion has a third cross-bar that engages both the first side bar and the second side bar and extends from the first side bar to the second side bar, wherein the third cross-bar is located between the first cross-bar and the second cross-bar in the longitudinal direction of the dual mold assembly, and wherein the third cross-bar is spaced from and free from engagement with the first cross-bar in the longitudinal direction of the dual mold assembly, and wherein the third cross-bar is spaced from and free from engagement with the second cross-bar in the longitudinal direction of the dual mold assembly.

5. The dual mold spacer as set forth in claim 3, wherein the first cross-bar is spaced from and free from engagement with the first and second terminal ends of the first side bar in the longitudinal direction of the dual mold assembly, and wherein the first cross-bar is spaced from and free from engagement with first and second terminal ends of the second side bar in the longitudinal direction of the dual mold assembly; and
   wherein the second cross-bar is spaced from and free from engagement with the first and second terminal ends of the first side bar in the longitudinal direction of the dual mold assembly, and wherein the second cross-bar is spaced from and free from engagement with the first and second terminal ends of the second side bar in the longitudinal direction of the dual mold assembly.

6. The dual mold spacer as set forth in claim 2, wherein the second side bar has a lower surface that is flat, wherein the flat lower surface of the second side bar is configured for engaging a flat upper surface of the second side rail.

7. The dual mold spacer as set forth in claim 2, wherein each of the cross-bars defines a center rib groove that are configured for the receipt of a center rib of the dual mold assembly, wherein the center rib grooves are configured such that the center rib is spaced from and free from engagement with the cross-bars.

8. The dual mold spacer as set forth in claim 2, wherein the cross-bars are located in the vertical direction of the dual mold assembly at a lower location than an upper surface of the first side bar, and wherein the cross-bars are located in the vertical direction of the dual mold assembly at a lower location than an upper surface of the second side bar.

9. The dual mold spacer as set forth in claim 1, wherein the first side portion, the second side portion, and the body portion are all made of aluminum alloy.

10. The dual mold spacer as set forth in claim 1, wherein the longitudinal length of the first side portion is less than a longitudinal length of a first mold of the dual mold assembly, wherein the longitudinal length of the first side portion is less than a longitudinal length of a second mold of the dual mold assembly; and
   wherein a longitudinal length of the second side portion is less than the longitudinal length of the first mold, and wherein the longitudinal length of the second side portion is less than the longitudinal length of the second mold.

11. A dual mold spacer for use with a dual mold assembly, comprising:
   a first side portion that is configured to engage a first side rail of the dual mold assembly;
   a second side portion that is configured to engage a second side rail of the dual mold assembly;
   a body portion that extends from the first side portion to the second side portion, wherein the body portion is configured to be located between a press of the dual mold assembly and first and second molds of the dual mold assembly, wherein the body portion is configured for being spaced from and free from engagement with the first and second molds of the dual mold assembly;
   wherein the first side portion is a first side bar, and wherein the second side portion is a second side bar;
   wherein the body portion comprising at least two cross-bars;
   wherein each of the two cross-bars defines a center rib groove that are configured for the receipt of a center rib of the dual mold assembly, wherein the center rib grooves are configured such that the center rib is spaced from and free from engagement with the cross-bars, and wherein the center rib grooves are located between the first and second side bars in a lateral direction of the dual mold assembly and are aligned with one another in the lateral direction of the dual mold assembly.

* * * * *